United States Patent [19]

Ryan

[11] Patent Number: 4,781,001
[45] Date of Patent: Nov. 1, 1988

[54] CONTINUOUS PRESET ACCESS HOUSING

[75] Inventor: Thomas G. Ryan, Bethel Park, Pa.

[73] Assignee: Cyclops Corporation, Pittsburgh, Pa.

[21] Appl. No.: 840,379

[22] Filed: Mar. 17, 1986

[51] Int. Cl.$^4$ .............................................. E04B 5/48
[52] U.S. Cl. ....................................... 52/220; 52/221; 52/334; 174/48; 174/49
[58] Field of Search ................ 52/220, 221, 334, 336, 52/450; 174/48, 49

[56] References Cited

U.S. PATENT DOCUMENTS

| | | | |
|---|---|---|---|
| 3,973,366 | 8/1976 | Balane et al. | 52/221 X |
| 4,106,249 | 8/1978 | Morton | 52/221 X |
| 4,554,771 | 11/1985 | Marwah et al. | 52/221 |
| 4,584,803 | 4/1986 | Ryan | 52/221 |
| 4,593,506 | 6/1986 | Hartman et al. | 52/221 |
| 4,593,507 | 6/1986 | Hartman | 52/221 |
| 4,594,826 | 6/1986 | Gray | 52/221 |
| 4,630,414 | 12/1986 | Ting | 52/220 |

FOREIGN PATENT DOCUMENTS 934224 8/1963 United Kingdom ................ 52/221

Primary Examiner—Carl D. Friedman
Assistant Examiner—Richard E. Chilcot, Jr.
Attorney, Agent, or Firm—Buchanan Ingersoll

[57] ABSTRACT

A continuous preset access housing formed in part by a corrugated housing member is disclosed. A corrugated decking sheet supports the longitudinally extending housing member above cells of the decking sheet and a layer of concrete is placed over the deck and housing. Openings through the concrete and housing member provide access to the underlying deck cells. Covers are provided over the openings to create fully enclosed underfloor housings to receive electrical receptacles and the like. The overall arrangement is such that the resulting system has increased flexibility, capacity and strength. Additionally, the system is more cost effective than systems which provide many individual housings.

7 Claims, 3 Drawing Sheets

CONTINUOUS PRESET ACCESS HOUSING

BACKGROUND OF THE INVENTION

1. Field of the Invention

This invention relates to an underfloor electrical wiring distribution system and specifically to a continuous preset access housing which permits access to service lines and the like contained in underlying deck cells from above an overlying concrete layer.

2. Description of the Prior Art

The use of plural spaced-apart individual preset insert housings to provide access to electrified flooring systems is well known. In most known systems, however, the preset inserts are rarely located precisely where they are needed when the time comes to activate them for required services. Further, in locations where access housings are not present, core drilling through an overlying concrete layer from above the deck cells and the provision of afterset housings is often required to access services in such cells. This process is inconvenient and time consuming. Additionally, the provision of individual access housings at each desired location is overly expensive, wasteful of materials and requires excessive labor for installation.

SUMMARY OF THE INVENTION

The present invention overcomes these problems by providing a single longitudinally extending continuous access housing which obviates the need for plural housings over a single underlying deck conduit. The present invention is designed for use in combination with at least one corrugated decking sheet supported by beams of a floor on a first horizontal level. An overlying layer of concrete which defines an upper floor surface is provided over the decking sheet. The decking sheet has spaced apart valley and crest portions which extend longitudinally the entire length of the sheet. Adjacent crest and valley portions of the decking sheet are connected by webbing portions. Service lines and the like are placed within cells formed within at least one of the crest and valley portions of the decking sheet.

The access housing of the present invention includes a corrugated housing member preferably formed from a single sheet of metal. The housing member also has spaced apart crest and valley portions with a webbing connecting adjacent crest and valley portions. The housing member is aligned parallel to and is positioned substantially above at least one selected cell on a second horizontal level vertically spaced above said first level. The housing member extends longitudinally substantially the entire length of the decking sheet or at least over all locations where access to the selected cells is desired. The crest portions of the housing member preferably extend up to a plane located parallel to and preferably one inch or more below the upper floor surface. When desired, one or more openings may be provided through the overlying concrete and into the housing member to allow for access through the housing member to the selected cell. Covers are provided over such openings and are preferably positioned coplanar with the upper floor surface creating an enclosed cavity within at least one of the crest or the valley portions of the housing member. The housing member provides an enclosure into which electrical receptacles and the like may be conveniently mounted. Further, the housing member provides sufficient working space to allow for installation or modification of underfloor service lines.

In the presently preferred embodiment of the invention, the housing member has crest and valley portions which extend across the width of the housing member and which are positioned transversely with respect to the crest and valley portions of the decking sheet. Alternatively, the valley and crest portions of the housing may be provided parallel to and extend the length of the crest and valley portions of the decking sheet.

It is an object of the present invention to provide a continuous preset access housing which has increased flexibility and capacity over existing industrial housings.

It is another object of the invention to utilize a housing which interlocks with the layer concrete due to the use of embossments.

A further object of the invention is to reduce costs through material and labor savings in manufacturing and installation.

These and other objects of the present invention will be more fully understood from the following description of the invention on reference to the illustrations appended hereto.

DESCRIPTION OF THE PREFERRED EMBODIMENTS

Figure 1A:
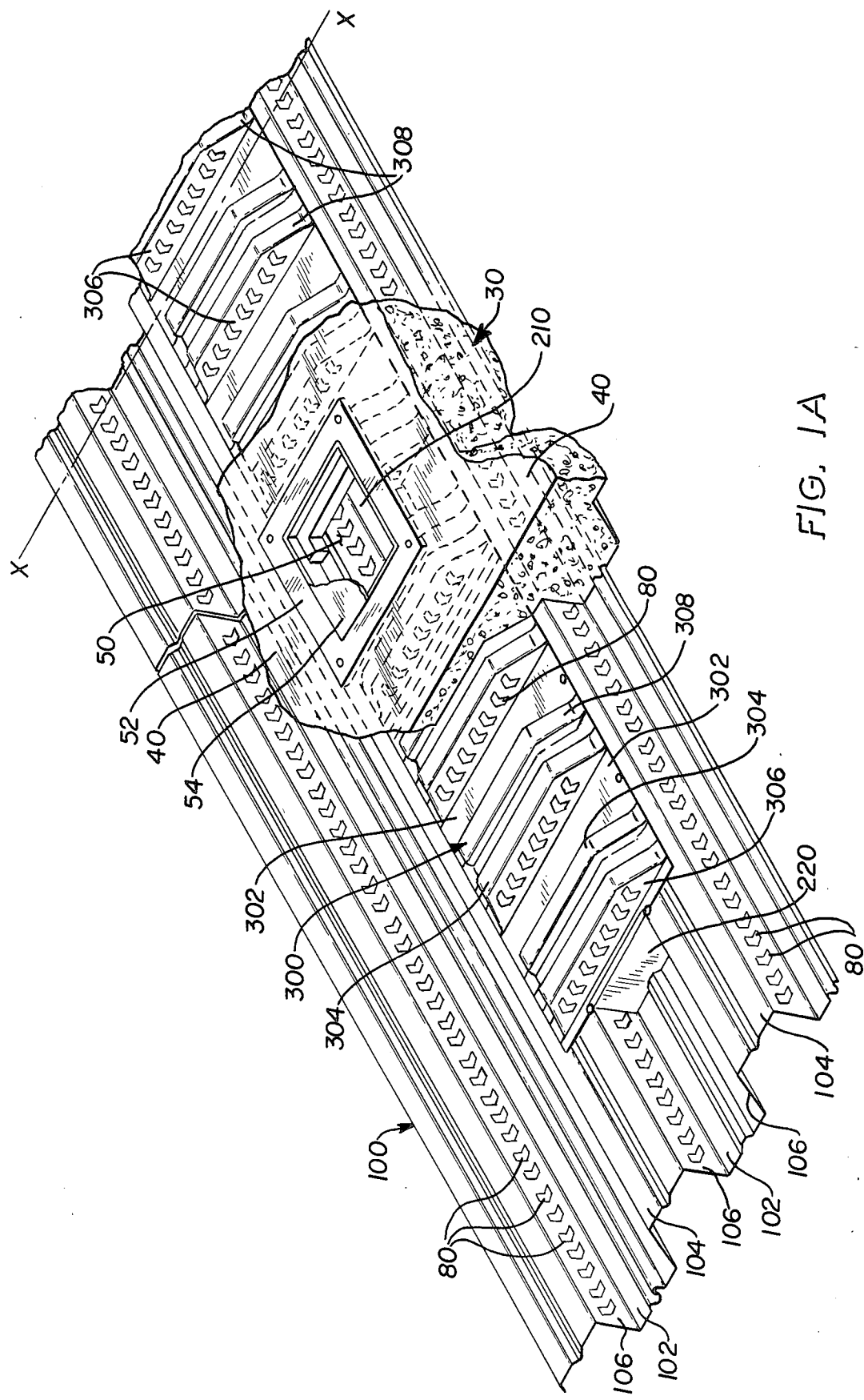
FIGS. 1A and 1B form a single isometric view broken into sections on the line X—X and illustrate the presently preferred embodiment of the continuous preset access housing of the present invention.
Figure 1B:
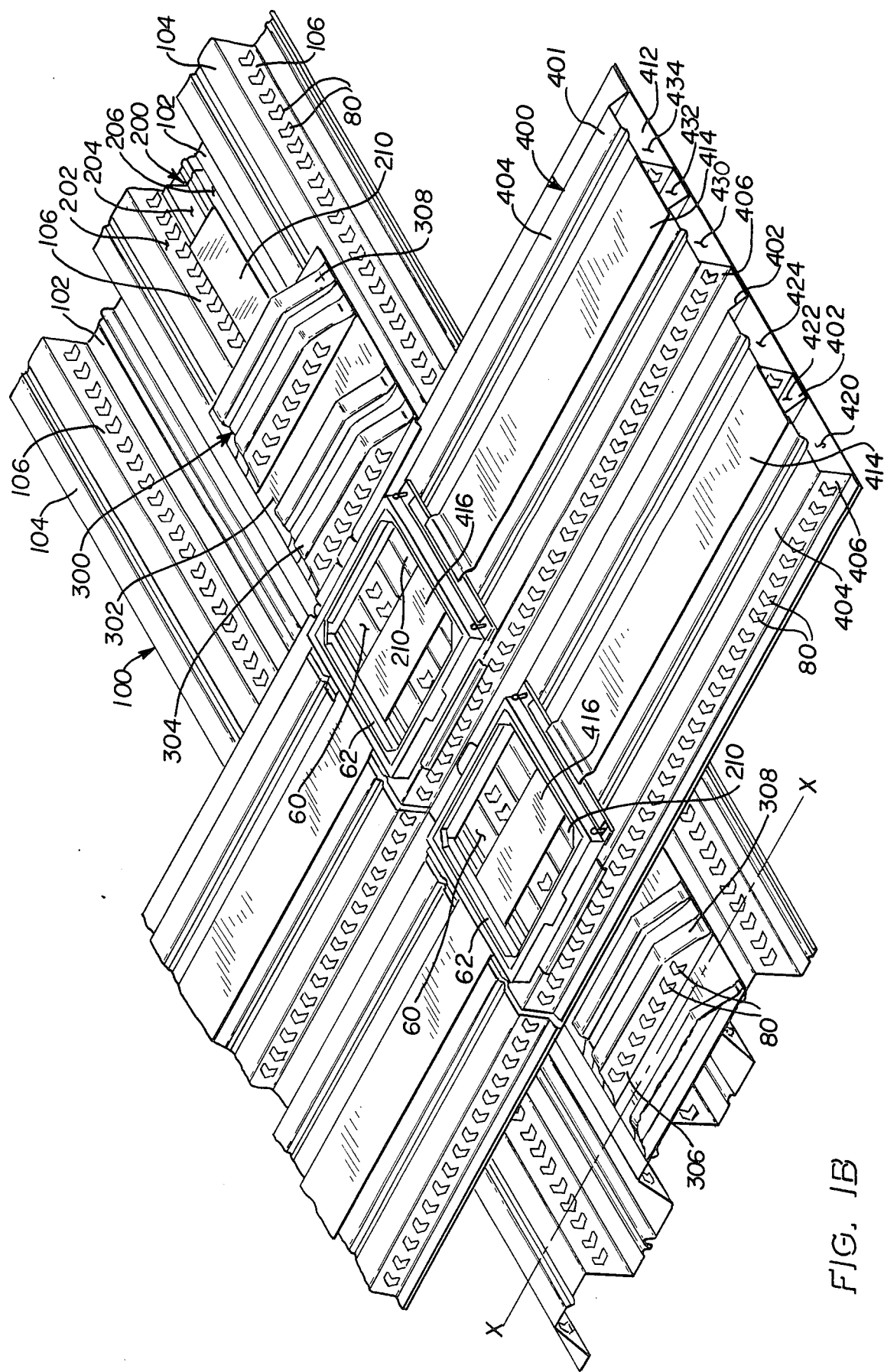

FIGS. 1A and 1B illustrate the presently preferred embodiment of the continuous preset access housing of the present invention. In its most basic form, the system comprises a corrugated housing member 300 supported above a corrugated metal decking sheet 100.

The corrugated metal decking sheet 100 is supported by supporting beams of a floor on a first horizontal level. An overlying layer of concrete 30 is provided over decking sheet 100 and housing member 300. The top of overlying layer of concrete 30 defines an upper floor surface 40. Decking sheet 100 has spaced apart valley portions 102 and crest portions 104 which extend longitudinally the entire length of decking sheet 100. Inclined webbing 106 connects adjacent valley portions 102 and crest portions 104. One or more parallel cells, such as cells 202, 204 and 206 may be provided in one or more of the valleys 102 or crests 104. Service lines and the like may be placed in cells 202, 204, and 206. A U-shaped dividing member 200 is preferably utilized to create plural cells in a single valley as shown in FIG. 1B.

The corrugated housing member 300 is supported by and attached to crests 104 of decking sheet 100 and is positioned parallel to and spaced substantially above one or more selected cells (such as cells 202, 204 and 206) on a second horizontal level. Housing member 300 preferably extends longitudinally for substantially the entire length of decking sheet 100 and acts as a cover for cells 202, 204 and 206 preventing concrete from entering therein. A separate cover 210 is preferably provided over cell 204 to isolate it from the other cells, thereby making it suitable for use in carrying electrical power lines. Cover 210 is preferably formed of a plastic material so that a utility knife or the like can be utilized to place openings therein at desired locations. If service lines are not required within the entire length of sheet 100, an end cap 220 may be utilized to prevent the ingress of concrete into cells 202, 204 and 206 and into housing 300.

To facilitate installation and shipping, housing member 300 is preferably fabricated in incremental lengths and assembled on the job site. Housing member segments each having four crest portions, for example, may be placed end-to-end to form a single housing 300 in the form shown in FIG. 1A.

Housing member 300 (or segments thereof) is preferably formed from a single sheet of metal and has spaced apart crest portions 304, valley portions 302 and vertical webbing portions 306 that extend across the width of the housing member and which are positioned transversely with respect to the crests 104 and valleys 102 of decking sheet 100. Side portions 308 of crests 304 slope downwardly closing off the crest portions of housing member 300. The crests 304 of member 300 extend substantially up to a plane located parallel to and approximately one inch below upper floor surface 40.

Embossments 80 are provided in webbing portions 106 and 306 of decking sheet 100 and housing member 300, respectively, to aid in securing concrete layer 30 to the floor deck and housing member.

As shown in FIG. 1B, a feeder unit 400 may be supported on crests 104 of deck sheet 100 on the second horizontal level of housing member 300. Feeder unit 400 is formed from a corrugated metal sheet 401, attached base sheet 412 and cover sheets 414. These elements create enclosed passageways 420, 422, 424, 430, 432 and 434 which are oriented transversely with respect to deck cells 202, 204 and 206 and utilized to transport services lines and the like from vertical closets to the deck cells for further distribution. Corrugated sheet 401 is formed to have crest portions 404, valley portions 402 and inclined webbing 406 connecting adjacent crests and valleys. Base sheet 412 creates passageways 420, 424, 430 and 434 within crests 404. Covers 414 over selected valleys create passageways 422 and 432 in certain valleys 402.

It will be obvious to those skilled in the art that suitable openings (not shown) are provided in base sheet 412 and covered valleys 402 of feeder unit 400 where feeder 400 crosses over deck cells 202, 204 and 206 to permit communication between the feeder passageways and the deck cells. By providing a double feeder unit as shown to create six independent passageways, it will also be obvious that a suitable divider (not shown) having the general form of end cap 220 could be positioned within the deck cells in the general area between passageways 420, 422, 424 and 430, 432, 434 to completely isolate services on opposite sides of such a divider. Passageways 420, 422 and 424 could transport service lines to the deck cells on one side of the divider and passageways 430, 432 and 434 could transport a second independent set of service lines to the opposite side of the divider. This arrangement is ideal where two occupants of a single floor of a building have diverse service needs and/or wish to maintain separate accounts for electrical or other service usage.

In the preferred embodiment of the present invention as shown in FIGS. 1A and 1B, a repetitive pattern of valleys 302 and crests 304 is continued across feeder unit 400 with valleys 402 and crests 404. With this arrangement, an even spacing of crests and valleys is created allowing for easy location of any desired crest by simple measurement after concrete 30 is poured over deck sheet 100, housing member 300 and feeder unit 400.

In accordance with the present invention, a layer of concrete 30 is poured over the entire floor area after the deck sheets 100, housing members 300 and feeder units 400 are all secured in their final desired positions. A completely uninterrupted upper floor surface 40 is thereby created which allows for the easy attachment of carpeting or other floor coverings over upper surface 40. Also, because the minimum thickness of concrete layer 30 is preferably one inch or greater (in locations over housing crests 304 and feeder unit 400), the floor is highly resistant to fire and has greater strength than floor structures having interruptions in an overlying concrete slab.

At any location above the feeder unit 400 or housing members 300 where access to service lines is required, an opening may be cut into concrete layer 30 and into housing member 300 or the feeder passageways. Access to a single crest portion 304 of housing member 300 may be provided by locating the crest by measurement or metal detector and cutting a small opening through the concrete layer 30 and the top surface of a single crest 304 with a diamond saw blade or any suitable means. The interior of crest 304 provides an enclosed metallic space into which electrical receptacles and the like may be mounted.

Where a larger housing is required, a larger opening, such as square opening 50, may be cut through concrete layer 30 and into two adjacent crests 304. The concrete in the valley 302 between the adjacent crests 304 is removed and a suitable frame member 52 is provided around the perimeter of opening 50 to accept a housing cover 54 (fragment shown). The housing cover is provided in a coplanar relationship with upper floor surface 40.

Similar access openings 60 with frames 62 may be provided through concrete layer 30 where access to the feeder passageways is required or to provide access to the area of communication between the feeder passageways and deck cells. After openings 60 are created, covers 416 may be provided over passageways 422 and 432 to isolate them from other passageways and cells. Additional feeder unit access covers (not shown) are provided over the entire opening 60 in a coplanar relationship with upper floor surface 40. Because the locations of intersection between the feeder passageways and deck cells is known prior to the pouring of the concrete and because access to this area of communication is required in most cases, it may be preferable to provide factory mounted frames with covers directly on the feeder unit around which the concrete is poured. This eliminates the need to remove portions of the slab to subsequently insert such access frames and covers.

Figure 2:
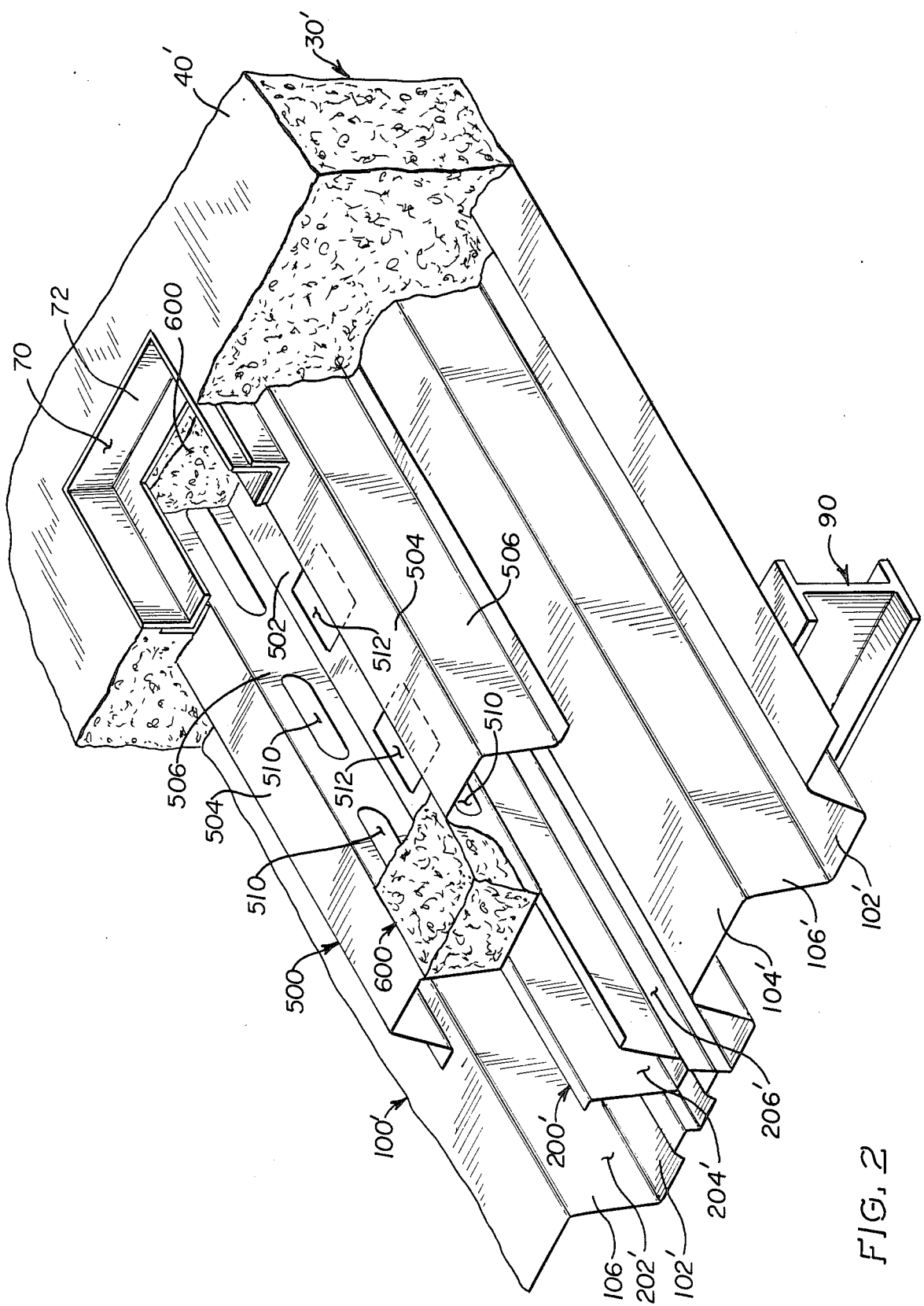
FIG. 2 is an isometric view illustrating an alternate embodiment of the continuous preset access housing.

FIG. 2 illustrates another embodiment of the continuous access housing of the present invention in which a housing member 500 and insulation block 600 are provided over corrugated metal decking sheets 100' and supported by beams 90. It is noted that numbers designated with a prime in FIG. 2 refer to similar components having the same number shown in FIGS. 1A and 1B.

The corrugated housing member 500 is supported by and attached to crest portions 104' of decking sheet 100'. Housing member 500 is positioned parallel to and spaced substantially above one or more cells, such as cells 202', 204' and 206' on a second horizontal level. Housing member 500 is formed from a single sheet of metal and has spaced apart crest portions 504 and valley portions 502 that extend longitudinally substantially the entire length of housing member 500 and which are positioned parallel with respect to crest portions 104' and valley portions 102' of decking sheet 100. The crest portions 504 of member 500 extend up to a plane located parallel to and approximately one inch below upper floor surface 40'. There are a plurality of openings 510 and 512 respectively in webbing portions 506 and valley portions 502 of housing member 500 which permit access through housing member 500 to cells 202', 204' and 206'. If desired, knock-out plugs may be provided in place of openings 510 and 512 to provide a more complete metal enclosure. The spacing and location of web openings 510 and valley openings 512 are preferably staggered to provide a convenient means of providing access to only one or two of cells 202', 204' and 206' while preventing access to the remaining cell or cells.

After housing member 500 is secured in position, a solid block 600 of an insulating material is placed into the entire length of valley 502 of housing member 500 prior to the pouring of concrete layer 30'. Preferably, block 600 is also fire resistant and does not give off toxic gases when heated. Block 600 prevents concrete from entering valley 502 and isolates openings 510 and 512.

At locations above housing member 500 where access to cells 202', 204' and 206' is desired, a opening 70 may be cut through concrete layer 30' in the area above valley 512. By simply removing an appropriate section of the insulating block 600 access to one or more desired deck cells can be provided through openings 510 and 512. If the block 600 is removed over one opening 512, for example, access is only provided to cell 204'. If block 600 is formed from a foam material, or the like, sections thereof can be easily removed with a utility knife or similar tool. Suitable electrical receptacles and the like may be mounted directly over openings 512 or within crests 504 behind openings 510. It is noted that housing member 500 provides a cover for deck cells 202', 204' and 206' and increases the capacity of cells 202' and 206'. A suitable frame 72 and cover (not shown) are provided around and over opening 70, respectively.

If block 600 is not provided, a cover over valley 502 is required to prevent the ingress of concrete therein. Further, without the block 600 suitable barriers of the general form of end cap 220 (FIG. 1A) are required if complete isolation of services is required.

By providing a single access housing which extends longitudinally the length of the underlying decking sheets the present invention eliminates the need for plural housing members above a single cell.

Whereas particular embodiments of the invention have been described above for purposes of illustration, it will be appreciated by those skilled in the art that numerous variations of the details may be made without departing from the invention as described in the appended claims.

I claim:

1. A continuous access housing for a cellular flooring system of the type having at least one corrugated metal decking sheet supported by an upper surface of supporting beams of a floor and an overlying layer of concrete having a top which defines an upper floor surface, said decking sheet provided on a first horizontal level and having spaced apart valley and crest portions extending longitudinally in the sheet and an inclined webbing connecting adjacent crest and valley portions, said decking sheet having at least one cell within at least one of the crest and valley portions thereof into which service lines and the like may be placed comprising:

(a) a corrugated metal housing member having at least two spaced apart crest portions and at least one intermediate valley portion with a webbing connecting adjacent crest and valley portions, at least one of insulating material and concrete filling at least a portion of said housing valley, said housing member supported by crest portions of the decking sheet on opposite sides of a valley of the decking sheet over which the housing member is positioned, said housing member extending longitudinally above and parallel to at least one cell on a second horizontal level vertically spaced above said first horizontal level, said housing member providing a separate enclosure for electrical receptacles and the like, said layer of concrete and said housing member also having at least one opening therein to allow for access into and through the housing member to the at least one cell from above the upper floor surface; and (b) a cover supported over said opening and positioned substantially coplanar with the upper floor surface whereby an enclosed cavity is created at least partially within at least one of said crest and valley portions of the housing member.

2. A continuous access housing for a cellular flooring system of the type having at least one corrugated metal decking sheet supported by an upper surface of supporting beams of a floor and an overlying layer of concrete having a top which defines an upper floor surface, said decking sheet provided on a first horizontal level and having spaced apart valley and crest portions extending longitudinally in the sheet and an inclined webbing connecting adjacent crest and valley portions, said decking sheet having at least one cell within at least one of the crest and valley portions thereof into which service lines and the like may be placed comprising:

(a) a corrugated metal housing member having at least two spaced apart crest portions and at least one intermediate valley portion with a webbing connecting adjacent crest and valley portions, said housing member supported by crest portions of the decking sheet on opposite sides of a valley of the decking sheet over which the housing member is positioned, said housing member extending longitudinally above and parallel to at least one cell on a second horizontal level vertically spaced above said first horizontal level, said housing member extending substantially the entire length of the decking sheet and having plural valley and crest portions which extend across the width of the housing member and which are positioned transversely with respect to the crest and valley portions of the decking sheet, said valley portions of the housing member having concrete therein, said layer of concrete and said housing member also having at least one opening therein to allow access into and through the housing member to the at lest one cell from above the upper floor surface; and (b) a cover supported over said opening and positioned substantially coplanar with the upper floor surface whereby an enclosed cavity is created at least partially within at least one of said crest and valley portions of the housing member.

3. A cellular flooring system according to claim 1 wherein embossments are provided in webbing portions of the housing member.

4. A cellular flooring system according to claim 1 wherein said housing member has valley and crest portions which extend longitudinally substantially the entire length of the housing member, said housing valley having a block of insulating material therein extending the length of the valley and said housing crest and valley portions positioned parallel with respect to the crest and valley portions of the decking sheet.

5. A continuous access housing for a cellular flooring system of the type having at least one corrugated metal decking sheet supported by an upper surface of supporting beams of a floor and an overlying layer of concrete having a top which defines an upper floor surface, said decking sheet provided on a first horizontal level and having spaced apart valley and crest portions extending longitudinally in the sheet and an inclined webbing connecting adjacent crest and valley portions, said decking sheet having at least one cell within at least one of the rest and valley portions thereof into which service lines and the like may be placed comprising:

(a) a corrugated metal housing member having at least two spaced apart crest portions and at least one intermediate valley portion with a webbing connecting adjacent crest and valley portions, at least one of insulating material and concrete filling at least a portion of said housing valley, said housing member supported by crest portions of the decking sheet on opposite sides of a valley of the decking sheet over which the housing member is positioned, said housing member extending longitudinally above and parallel to at least one cell on a second horizontal level vertically spaced above said first horizontal level, said layer of concrete and said housing member also having at least one opening therein to allow access into and through the housing member to the at least one cell from above the upper floor surface; and (b) a cover supported over said opening and positioned substantially coplanar with the upper floor surface whereby an enclosed cavity is created at least partially within at least one of said crest and valley portions of the housing member, said at least one opening and cover are provided over at least one crest portion of said housing member to create an enclosed cavity at least partially within said at least one crest portion.

6. A continuous access housing for a cellular flooring system of the type having at least one corrugated metal decking sheet supported by an upper surface of supporting beams of a floor and an overlying layer of concrete having a top which defines an upper floor surface, said decking sheet provided on a first horizontal level and having spaced apart valley and crest portions extending longitudinally in the sheet and an inclined webbing connecting adjacent crest and valley portions, said decking sheet having at least one cell within at least one of the crest and valley portions thereof into which service lines and the like may be placed comprising:

(a) a corrugated metal housing member having at least two spaced apart crest portions and at least one intermediate valley portion with a webbing connecting adjacent crest and valley portions, at least one of insulating material and concrete filling at least a portion of said housing valley, said housing member supported by crest portions of the decking sheet on opposite sides of a valley of the decking sheet over which the housing member is positioned, and said housing member extending longitudinally above and parallel to at least one cell on a second horizontal level vertically spaced above said first horizontal level, said layer of concrete and said housing member also having at least one opening therein to allow access into and through the housing member to the at least one cell from above the upper floor surface; and (b) a cover supported over said opening and positioned substantially coplanar with the upper floor surface whereby an enclosed cavity is created at least partially within at least one of said crest and valley portions of the housing member, said at least one opening including openings in a housing member valley and in a housing member webbing and the cover being provided over said housing member valley and housing member webbing portions and section of the insulating block therein being removed to create an enclosed cavity within at least a portion of said valley whereby isolated access to at least one cell is provided through one of said valley openings and said webbing openings.

7. A continuous access housing for a cellular flooring system of the type having at least one corrugated metal decking sheet supported by an upper surface of supporting beams of a floor and an overlying layer of concrete having a top which defines an upper floor surface, said decking sheet provided on a first horizontal level and having spaced apart valley and crest portions extending longitudinally in the sheet and an inclined webbing connecting adjacent crest and valley portions, said decking sheet having at least one cell within at least one of the crest and valley portions thereof into which service lines and the like may be placed comprising:

(a) a corrugated metal housing member having at least two spaced apart crest portions and at least one intermediate valley portion with a webbing connecting adjacent crest and valley portions, at least one of insulating material and concrete filling at least a portion of said housing valley, said housing member supported by crest portions of the decking sheet on opposite sides of a valley of the decking sheet over which the housing member is positioned, said housing member extending longitudinally above and parallel to at least one cell on a second horizontal level vertically spaced above said first horizontal level, said layer of concrete and said housing member also having at least one opening therein to allow access into and through the housing member to the at least one cell from above the upper floor surface; and (b) a cover supported over said opening and positioned substantially coplanar with the upper floor surface whereby an enclosed cavity is created at least partially within at least one of said crest and valley portions of the housing member, said cellular flooring system further comprising a corrugated feeder unit supported on the second horizontal level by said crest portions of the decking sheet, said feeder unit including a corrugated sheet having spaced-apart valley and crest portions with a webbing connecting adjacent crests and valleys and at least one of a cover supported over selected valleys and a base attached beneath selected crests to create at least one feeder passageway within at least one of the crests and valleys, said passageway extending transversely with respect to the deck cells.

* * * * *